United States Patent Office 3,115,164
Patented Dec. 24, 1963

3,115,164
REINFORCED PLASTIC COMPOSITION AND
PROCESS OF PREPARING THE SAME
Byron M. Vanderbilt, Westfield, N.J., assignor to Esso
Research and Engineering Company, a corporation of
Delaware
No Drawing. Filed Nov. 2, 1959, Ser. No. 850,119
20 Claims. (Cl. 138—125)

This invention relates to a method for decreasing the brittleness of a reinforced plastic and more particularly to an improved end product therefrom.

It is known that a reinforcing element, such as glass fiber, can be laminated with a resinifiable polymer capable of setting to a hard non-thermoplastic material to provide a reinforced plastic therefrom. In the past polyesters have been used; however the laminates therefrom have a tendency to crack and craze due to the brittleness of the highly crosslinked resin. This is a serious disadvantage if the reinforced plastics are being used for panels where good surface characteristics are essential, or for piping for handling water and aqueous liquids.

In order to decrease the brittleness and tendency to craze of polyesters, manufacturers have modified them by substituting a part of the maleic or fumaric acid used in the synthesis with an equivalent amount of such acids as phthalic anhydride, adipic acid, and the like. However, use of such acids decreases the polymerization rate of the polyesters, and the use of such saturated acids has not proved to be a satisfactory solution to the problem since the crazing has not been completely eliminated. Furthermore, plasticizers which are effective in thermoplastic materials such as tricresyl phosphate, dioctyl phthalate, didecyl adipate, aromatic oils, mineral and vegetable waxes, and the like are not applicable in thermosetting resins such as the polyesters. Although compatible in the uncured resin, once cured the plasticizers become incompatible, and opaque laminates of low strength are obtained therefrom.

It has now been discovered that the aforementioned problem can be overcome by including a small, controlled amount of a vinyl or allyl (alkenyl) ester of a higher fatty acid in the reinforced plastic. Thus, in accordance with this invention, a resinfiable mix is prepared comprising a curable polymer, e.g., a polyester; a crosslinking agent; a peroxide catalyst; and an unsaturated ester of a fatty acid, e.g., vinyl stearate. A reinforcing element is subsequently laminated with this mix and cured to a unitary reinforced plastic.

Curable polymers within the purview of this invention comprise non-thermoplastic resins and/or thermosetting resins which employ a peroxide type catalyst, e.g., polyesters, polydiolefins, and styrene-divinyl benzene-type copolymers. The unsaturated polyesters as defined in this invention may be derived by the condensation of compounds containing polyhydroxyl and polycarboxyl groups and have an unsaturated carbon bond with a typical structure as indicated below:

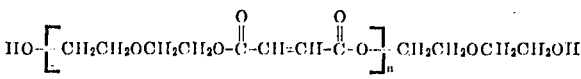

wherein $n$ represents the degree of condensation. Appropriate unsaturated polyesters are obtained by condensing or esterifying such alpha-beta unsaturated dicarboxylic acids as maleic acid, fumaric acid, itaconic acid, and derivatives thereof containing a functioning ethylenic group, with appropriate glycols such as ethylene glycol, diethylene glycol, other polyethylene glycols, propylene glycol-1,2, and the like. It is apparent that the polyesters of the ethylenically unsaturated dicarboxylic acids may also include a certain amount of a polyhydric alcohol such as pentaerythritol, sorbitol, mannitol, or the like. In general, these polyhydric alcohols include from 4 to 6 hydroxyls. They may also contain a certain proportion of combined saturated dibasic acid such as adipic, phthalic or isophthalic acid. The unsaturated polyesters are described in detail in U.S. Patents 2,688,006 and 2,769,742 which are incorporated herein by reference. They are available commercially under such trade names listed below:

(a) Selectron resins manufactured by Pittsburgh Plate Glass Company
(b) Paraplex resins manufactured by Resinous Products Division, Rohm and Haas Company
(c) Vibrin resins manufactured by Naugatuck Chemical Division, U.S. Rubber Company
(d) Laminac resins manufactured by American Cyanamid Company Another specific polyester which is suitable for this invention is a fumaric acid ester of an alkylene oxide condensate of bisphenol-A.

Other curable polymers which can be included in the resinifiable mix of this invention are prepared from diolefins, particularly those which are conjugated and have 4 to 6 carbon atoms per molecule, such as butadiene, hexadiene, isoprene, dimethyl butadiene, piperylene, and methyl pentadiene. Diolefins may be used which are copolymerized with minor amounts of ethylenically unsaturated monomers such as styrene, acrylonitrile, methyl vinyl ketone, or with styrenes, having alkyl groups substituted on the ring, e.g., paramethyl styrene, dimethyl styrene, etc. These polymers therefore include the homopolymer of butadiene and the copolymer of butadiene with styrene. A preferred diolefin polymeric oil is one prepared by reacting 75 to 85 parts of butadiene and 25 to 15 parts of styrene in the presence of metallic sodium catalyst. Polymerization is carried out in a reaction diluent at temperatures from about 25° C. to 105° C. with about 0.5 to 5 parts of finely divided sodium per 100 parts of monomers used. The diluent used in the polymerization must boil between about —15° C. and 200° C., in amounts ranging from 100 to 500 parts per 100 parts of monomers; preferred diluents are aliphatic hydrocarbons such as solvent naphtha or straight-run mineral spirits such as Varsol. In order to obtain a water white product, a codiluent, about 10 to 45 parts per 100 parts of monomers, may also be used, consisting of a $C_4$ to $C_8$ aliphatic ether or cyclic ethers and polyethers other than those having a —O—C—O— grouping; particularly useful ethers are dioxane-1,4 and diethyl ether. Finally, it is beneficial to use about 5 to 35 weight percent, based on sodium, of an alcohol such as methanol, isopropanol, or an amyl alcohol in order to overcome the initial induction period. The resulting product may vary in viscosity from 0.15 to 20 poises.

The preparation of this oil in the presence of an alkali metal or peroxide catalyst is described in U.S. Patents 2,762,851 and 2,586,594, which are also incorporated herein by reference.

A styrene-divinyl benzene-type monomer mix is also applicable to this invention. The major ingredient is a styrene compound with the following structure:

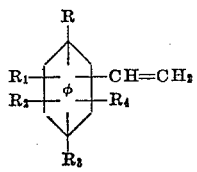

wherein R, $R_1$, $R_2$, $R_3$, and $R_4$ may be the same or different groups and are therefore independently selected from the group consisting of hydrogen, halogens, and alkyl radicals containing not more than eighteen carbon atoms. Other aromatic nuclei besides the benzene group are applicable, such as the naphthalene, bisphenyl, biphenyl, and other condensed ring groups. The polyvinyl compound has the following structure:

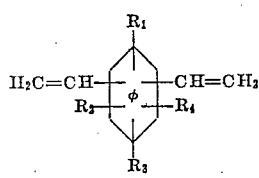

wherein $R_1$, $R_2$, $R_3$, and $R_4$ are each independently selected from the group consisting of hydrogen, halogens, alkyl groups, and a vinyl group; and $\phi$ is an aromatic nucleus such as benzene, naphthalene, biphenyl, and phenanthrene.

Crosslinking agents may be added to the curable polybutadiene type polymer to impart an effective crosslinking of the resin. Such agents comprise the following compounds: vinyl aromatics such as styrene and vinyl toluene; halo styrenes; vinyl naphthalenes; alkyl acrylates, e.g., methacrylates; alkyl fumarates, e.g., diethyl fumarate; and allyl esters; acrylonitrile; vinyl chloride; and vinylidene chloride. Preferred compounds are diallyl phthalate and the styrenes. The especially preferred compound is vinyl toluene or monomethyl styrene. The crosslinking agent is generally included within the range of 0 to 60% of the curable liquid mix, preferably 30 to 60%.

A catalyst is also incorporated in the resinifiable polybutadiene mix within the range of 0.2 to 10 parts, preferably 0.2 to 5 parts. The catalyst is advantageously a free radical or peroxide type such as dialkyl or aralkyl peroxides, e.g., dicumyl peroxide and ditertiary butyl peroxide; and alkyl perester peroxides, e.g., ditertiary butyl diperphthalate and tertiary butyl perbenzoate. Dicumyl peroxide and ditertiary butyl peroxide are preferred, and benzoyl peroxide may also be employed in the mix.

In accordance with this invention an alkenyl ester of a higher fatty acid is incorporated in any of the resinifiable mixes above described. The acids within the scope of this invention are normal carboxylic acids with 10 to 22, preferably 14 to 18, carbon atoms. Accordingly, the following esters may be employed: vinyl stearate, vinyl palmitate, vinyl laurate, vinyl myristate, vinyl linoleate, vinyl oleate, allyl stearate, allyl oleate, allyl palmitate and mixtures thereof; however, vinyl stearate is preferred. These esters generally comprise 0.5 to 15 parts by weight, preferably 1 to 5 parts, per 100 parts of mix (p.h.m.).

The reinforcing elements that are applicable to this invention include such items as mineral materials, e.g., glass, asbestos, mica, rock, and celite; vegetable materials, e.g., cotton, linen, rayon, and silk; organic materials, e.g., hair, nylon, and Orlon; and metallic materials, e.g., iron, aluminum, and copper. Reinforcing elements may comprise 80% by weight of the reinforced plastic, preferably 35 to 80%. However, the preferred material is glass fiber. In accordance with this invention, glass fiber is defined as any fibrous glass unit to include filament yards, rovings, reinforcing mats, staple yards, woven fabrics, and milled fibers. A protective size may be applied to glass fibers. Examples of sizes which can be used are as follows: starch-mineral oil mixtures; polyvinyl acetate; polyisobutylene; copolymers of isobutylene with isoprene; and copolymers of butadiene with styrene. It is within the scope of this invention to use glass fiber which has been treated with an unsaturated organic halo silane; having the formula $R_n SiX_{4-n}$ wherein R is vinyl or allyl group, $n$ is a positive integer equal to 1, 2, or 3, and X is halogen. It is also possible to incorporate 0.1 to 5 parts of a silane ester in the resinifiable mix which has the general formula $R_n Si(OR_1)_{4-n}$, wherein R is an unsaturated group, e.g., vinyl, allyl, methallyl, or crotyl group; $n$ is a positive integer equal to 1, 2, or 3; and $R_1$ is an alkyl or aryl group or substitutes thereof. It is believed that the above-described silanes react with the hydroxyl groups in the glass. The unsaturated or vinyl portion of the molecule, bound to the glass through the silicon atom, reacts with the polymer during the curing step, thus effectively bonding the curable polymer and the glass fiber.

The reinforcing agent can be laminated with the resinifiable polymer mix. A laminate, according to this invention, is defined as a composite mass of a reinforcing agent and a thermosetting resin. This, therefore, includes layers of cloth and resin; fibers embedded in a resin; and fibers saturated with resin and formed in a hollow cylindrical pipe. Accordingly, lamination can be accomplished by any known method. For example, the resin mix can be combined with glass cloth by brush impregnation; by being poured into the center of several piles of dry cloth assembled on cellophane-covered glass plate; and by dipping the cloth into the resin mix.

Thus, one method used in the manufacture of solid rectangular sheets, is to form layers of curable polymer mix and glass fibers. After the desired thickness is obtained, the sheet is cured to a unitary reinforced plastic. Another method can be used for the manufacture of cylindrical hollow pipes. Glass fibers can be dipped in the curable polymer mix and wound about a steel mandrel. This can be accomplished by any method. In one method, the fiber rovings, e.g., glass fibers, are wound at an angle to the axis of the mandrel circumferentially in superimposed layers to form a peripheral shell of the pipe (U.S.P. 2,714,414). After the desired shape is obtained, the wrapping can be cured to form the unitary rigid pipe.

The reinforcing elements laminated with the resinifiable polymeric mix are subsequently cured by any known method. A suitable method is by baking in a press mold at a temperature between room temperature and 300° F. for between 1 minute and 2 hours. A postcure, if desired, may be employed at a temperature between 250° and 400° F. for 1 to 10 hours.

Thus in accordance with this invention, it is now possible to decrease the brittleness of laminates and other reinforced structures by a plasticization effect without any tendency for the plasticizer to precipitate or bloom to the surface. Accordingly the physical properties of a reinforced plastic, such as a polyester laminate, have been improved; and furthermore the retention of the strength of the laminate is outstanding.

The following examples are submitted to illustrate and not to limit this invention:

EXAMPLE I

Laminates A, B, C, D, E, and F were provided by saturating 14 plies of 181 glass cloth with 136 vinyl silane finish thereon with the resinifiable mixes indicated in Table I. These saturated cloths were subsequently placed in a ⅛ inch press mold and cured for 1 hour at 275° F. Some of the laminates were subjected to a postcure at 300° F. for 1 hour. The physical properties of the resulting laminates are shown in Table II herebelow:

Table I

| Compounds (pts. by wt.) | A | B | C | D | E | F |
|---|---|---|---|---|---|---|
| Atlac 382 polyester [1] | 50 | 50 | 50 | 50 | 50 | 50 |
| Vinyl stearate | | | 2 | 2 | 5 | 5 |
| Vinyl toluene | 50 | 50 | 48 | 48 | 45 | 45 |
| Dicumyl peroxide | 1 | 1 | 1 | 1 | 1 | 1 |

[1] A polyester product of the Atlas Powder Co., a fumaric acid ester of alkylene oxide condensate of bisphenol-A. The acid number is 20–25.

Table II

| | A | B | C | D | E | F |
|---|---|---|---|---|---|---|
| Postcure | No | Yes | No | Yes | No | Yes |
| Flexural Strength at room temp | 59,500 | 60,500 | 57,500 | 62,500 | 54,500 | 53,500 |
| Flexural Strength at 170° F | 55,500 | 52,000 | 50,500 | 51,500 | 39,500 | 40,500 |
| Flexural Strength after one week in boiling water | 47,000 | 52,000 | 54,500 | 56,000 | | |

The retention of physical strength was outstanding for the laminate with 2% vinyl stearate therein which was subjected to boiling water for one week. Furthermore the laminates containing vinyl stearate were substantially free of crazing and had very clear surfaces.

EXAMPLE II

A resinifiable polymeric mix was provided comprising 70 parts of Paraplex-43 (a polyester manufacture from polyethylene glycol and maleic anhydride), 30 parts of styrene, and 1 part of dicumyl peroxide. This mix was impregnated on 14 plies of 181 glass cloth with 136 vinyl silane finish thereon. The impregnated cloths were placed in a mold and cured for one hour at 275° F. to form laminate G which was 0.135 inch in thickness. Laminate H was formed by a similar procedure except that 2 parts of vinyl stearate were incorporated into the resinifiable polymeric mix. Table III shows the physical properties which were determined for each of these laminates.

Table III

| Laminate | Flexural Strength, p.s.i. | | Flexural Strength | Appearance |
|---|---|---|---|---|
| | Room Temp. | 250° F. | After One Week in Boiling Water | |
| G | 74,000 | 18,000 | 31,500 | Crazing. |
| H | 70,000 | 15,000 | 44,000 | Clearer and Smoother Surface. |

It is manifest from this example that the incorporation of the vinyl stearate in the resinfiable mix resulted in a laminate with superior appearance and surface characteristics, and furthermore the loss in physical strength was relatively small and was less affected by contact with boiling water.

EXAMPLE III

A resinifiable mix of the following composition was prepared:

94 parts of methyl styrene
6 parts of 55% divinyl benzene containing primarily ethyl vinyl benzene as impurity
0.25 part of A-172 silane [1]
1.0 part of dicumyl peroxide This mix was used for impregnating 14 layers of 181–136 glass cloth, and then cured in a mold for 1 hour at 275° F. to give a laminate (I) 0.144 inch in thickness. Half of the laminate was post cured in a hot air oven for an additional two hours at 300° F. (laminate J).

The above procedure was repeated except that 5 parts

[1] Vinyl silane ester of monoethyl ether of ethylene glycol.

of the methyl styrene were replaced by 5 parts of vinyl stearate. Laminates K and L therefrom have physical properties as follows:

| Laminate | Vinyl Stearate in Mix (percent) | Post Cure (Hrs.) | Flexural Strength (p.s.i.) | | Flexural Strength (p.s.i.) After In Boiling Water For— | |
|---|---|---|---|---|---|---|
| | | | Room Temp. | 170° F. | 2 Hrs. | 7 Days |
| I | 0 | None | 63,500 | 57,000 | 56,500 | 49,000 |
| J | 0 | 2 | 63,000 | 56,000 | 58,000 | 49,500 |
| K | 5 | None | 64,000 | 42,500 | 60,000 | 57,500 |
| L | 5 | 2 | 63,500 | 48,500 | 61,500 | 60,000 |

This example demonstrates that a laminate containing 5% of vinyl stearate therein has the best water resistance of any reinforced plastic available today. In addition, the laminate containing vinyl stearate had excellent texture and was less subject to damage by impact as compared to a laminate with no vinyl stearate therein.

EXAMPLE IV

A mix was made from the following ingredients:

88½ parts of styrene
9 parts of 55% divinyl benzene
2 parts of vinyl stearate
0.5 part of A-172 silane
1.0 part of dicumyl peroxide This mix was used for impregnating 14 layers of 181 glass cloth containing a No. 136 silane finish. The mixture was cured in a ⅛ inch mold for one hour at 275° F. This laminate is designated as M.

Laminate N was prepared in a similar manner except that the proportion of styrene to 55% divinyl benzene was 79½/18 making 10% of divinyl benzene in the mix. Laminate O was prepared using 90½ parts of styrene, 9 parts of 55% divinyl benzene, and no vinyl stearate.

| Laminate | Percent Divinyl Benzene | Percent Vinyl Stearate | Flexural Strength | | Appearance |
|---|---|---|---|---|---|
| | | | Room Temp. | After 7-day Water Boil | |
| M | 5 | 2 | 63,500 | 50,500 | Very Smooth and Uniform. |
| N | 10 | 2 | 54,500 | 47,000 | Less Crazing than O. |
| O | 5 | 0 | 65,500 | 46,000 | Crazed. |

This example shows the use of the vinyl stearate resulted in less crazing of the surface and improved resistance to boiling water.

EXAMPLE V

Vinyl oleate is a liquid at room temperature and offers some advantage over vinyl stearate in ease of handling. When used in 1% concentration in Paraplex-43, a polyester prepared from polyethylene glycol and maleic anhydride, laminated with glass cloth and cured as per Example II, a laminate of high-flexural strength, i.e., 73,500 p.s.i., was obtained which had less surface crazing than a similar laminate prepared with no fatty acid ester therein.

EXAMPLE VI

Styrene laminates containing 5% of divinyl benzene and 5% vinyl oleate or 5% allyl stearate were prepared. After the 1 hour cure at 275° F., the one containing the vinyl oleate had a flexural strength of 56,500 p.s.i., and the one containing the allyl stearate, 51,000. Both had improved surface characteristics.

EXAMPLE VII

A resin mix of the following proportion was prepared:

86 parts of styrene
9 parts of 57% divinyl benzene
5 parts of vinyl stearate
0.25 part of A-172 silane
1.0 part of dicumyl peroxide This mix was used for impregnating 14 layers of 181-glass cloth which had a No. 136 silane finish. The impregnated cloth was placed in a ⅛-inch mold and cured in a press at 275° F. for one hour to provide laminate P. The laminate was cut into halves and one half was post cured for 2 hours at 300° F. to form laminate Q. Evaluation data is shown herebelow:

| Laminate | Post Cure | Flexural Strength (p.s.i.) | | | | |
|---|---|---|---|---|---|---|
| | | Room Temp. | 170° F. | 250° F. | 2-hr. Boil | 7-day Boil |
| P | No | 55,000 | 29,000 | 7,500 | 50,500 | 51,000 |
| Q | Yes | 58,000 | 36,500 | 7,500 | 53,500 | 54,000 |

Use of this vinyl stearate internal plasticizer results in a laminate of phenomenal resistance to boiling water.

Having set forth the general nature and specific embodiments of the present invention, the true scope is now particularly pointed out in the appended claims.

What is claimed is:

1. A fiber reinforced plastic pipe comprising a reinforcing fiber laid up circumferentially in superimposed layers to form the peripheral shell of the pipe; said fibers being bonded and laminated with a thermosetting resin selected from the group consisting of polyesters formed by esterifying alpha-beta unsaturated dibasic carboxylic acids with polyhydric alcohols and reacting said esters with up to 60% by weight, of the curable liquid mix, of a monovinyl aromatic monomer, as a crosslinking agent, and copolymers formed by copolymerizing a major amount of a styrene and a minor amount of a divinyl benzene, said resins being cured in the presence of a peroxide catalyst and between about 0.5 and about 15 parts by wt. of an alkenyl ester of a $C_{10}$ to $C_{22}$ fatty acid per hundred parts by weight of the thermosetting resin mix.

2. A process of preparing a reinforced plastic composition which comprises impregnating a reinforcing element with a thermosetting resin selected from the group consisting of unsaturated polyesters formed by esterifying alpha-beta unsaturated dibasic carboxylic acids with polyhydric alcohols and reacting said esters with up to 60% by weight, of the curable liquid mix, of a monovinyl aromatic monomer, as a crosslinking agent, and copolymers formed by copolymerizing a major amount of a styrene and a minor amount of divinyl benzene, said resins being cured in the presence of a peroxide catalyst and between about 0.5 and about 15 parts by wt. of an alkenyl ester of a $C_{10}$ to $C_{22}$ fatty acid per hundred parts by weight of the thermosetting resin mix.

3. A process as in claim 2 wherein the alkenyl ester is a vinyl ester of a $C_{14}$ to $C_{18}$ fatty acid.

4. A process as in claim 2 in which the alkenyl ester is selected from the group consisting of vinyl stearate, vinyl palmitate, vinyl laurate, vinyl myristate, vinyl oleate, vinyl linoleate, allyl stearate, allyl oleate and allyl palmitate.

5. A process of preparing a reinforced plastic composition which comprises impregnating a reinforcing element with a thermosetting resin formed by copolymerizing a major amount of a styrene and a minor amount of a divinyl benzene and curing the resultant copolymer in the presence of a peroxide catalyst and between about 0.5 and about 15 parts by wt. of an alkenyl ester of a $C_{10}$ to $C_{22}$ fatty acid per hundred parts by weight of the thermosetting resin mix.

6. A process of preparing a reinforced plastic composition which comprises impregnating a reinforcing element with a thermosetting resin of unsaturated polyesters formed by esterifying alpha-beta unsaturated dibasic carboxylic acids with polyhydric alcohols and reacting said esters with up to 60% by weight, of a curable liquid mix, of a monovinyl aromatic monomer, as a crosslinking agent, and curing the resultant unsaturated polyesters in the presence of a peroxide catalyst and between about 0.5 and about 15 parts by wt. of an alkenyl ester of a $C_{10}$ to $C_{22}$ fatty acid per hundred parts of the thermosetting resin mix.

7. A process for preparing a composite pipe which comprises forming a cylinder of reinforcing fibers imbedded in a thermosetting resin selected from the group consisting of unsaturated polyesters formed by esterifying alpha-beta unsaturated dibasic carboxylic acids with polyhydric alcohols and reacting said esters with up to 60% by weight, of the curable liquid mix, of a monovinyl aromatic monomer, as a crosslinking agent, and copolymers formed by copolymerizing a major amount of a styrene and a minor amount of a divinyl benzene, said resins being cured in the presence of a peroxide catalyst and between about 0.5 and about 15 parts by wt. of an alkenyl ester of a $C_{10}$ to $C_{22}$ fatty acid per hundred parts by weight of the thermosetting resin mix.

8. A reinforced plastic composition comprising a reinforcing element and a thermosetting resin selected from the group consisting of unsaturated polyesters formed by esterifying alpha-beta unsaturated dibasic carboxylic acids with polyhydric alcohols and reacting said esters with up to 60% by weight, of the curable liquid mix, of a monovinyl aromatic monomer, as a crosslinking agent, and copolymers formed by copolymerizing a major amount of a styrene and a minor amount of a divinyl benzene, said resins being cured in the presence of a peroxide catalyst and between about 0.5 and about 15 parts by wt. of an alkenyl ester of a $C_{10}$ to $C_{22}$ fatty acid per hundred parts by weight of the thermosetting resin mix.

9. A composition as in claim 8 wherein the alkenyl ester is a vinyl ester of a $C_{14}$ to $C_{18}$ fatty acid.

10. A composition as in claim 9 in which the alkenyl ester is selected from the group consisting of vinyl stearate, vinyl palmitate, vinyl laurate, vinyl myristate, vinyl oleate, vinyl linoleate, allyl stearate, allyl oleate and allyl palimitate.

11. A composition as in claim 8 wherein the alkenyl ester is vinyl stearate.

12. A composition as in claim 8 wherein the alkenyl ester is vinyl oleate.

13. A composition as in claim 8 wherein the alkenyl ester is allyl oleate.

14. A reinforced plastic composition comprising a reinforcing element and a thermosetting resin formed by copolymerizing a major amount of styrene and a minor amount of divinyl benzene and curing the resultant copolymer in the presence of a peroxide catalyst and between about 0.5 and about 15 parts by wt. of an alkenyl ester of a $C_{10}$ to $C_{22}$ fatty acid per hundred parts by weight of the thermosetting resin mix.

15. A composition as in claim 14 wherein the alkenyl ester is a vinyl ester of a $C_{14}$ to $C_{18}$ fatty acid.

16. A composition as in claim 14 wherein the alkenyl ester is selected from the group consisting of vinyl stearate, vinyl palmitate, vinyl laurate, vinyl myristate, vinyl oleate, vinyl linoleate, allyl stearate, allyl oleate and allyl palmitate.

17. A composition as in claim 14 wherein the copolymer reactants are styrene and divinyl benzene and the alkenyl ester is vinyl stearate.

18. A reinforced plastic composition comprising a reinforcing element and a thermosetting resin formed by esterifying alpha-beta unsaturated dibasic carboxylic acids with polyhydric alcohols, reacting said esters with up to 60% by weight, of the curable liquid mix, of a monovinyl aromatic monomer, as a crosslinking agent, and curing the resultant unsaturated polyesters in the presence of a peroxide catalyst and between about 0.5 and about 15 parts by wt. of an alkenyl ester of a $C_{10}$ to $C_{22}$ fatty acid per hundred parts of the thermosetting resin mix.

19. A composition as in claim 18 wherein the alkenyl ester is a vinyl ester of a $C_{14}$ to $C_{18}$ fatty acid.

20. A composition as in claim 18 wherein the alkenyl ester is selected from the group consisting of vinyl stearate, vinyl palmitate, vinyl laurate, vinyl myristate, vinyl oleate, vinyl linoleate, allyl stearate, allyl oleate and allyl palmitate.

References Cited in the file of this patent

UNITED STATES PATENTS

| | | |
|---|---|---|
| 2,118,864 | Reppe et al. | May 31, 1938 |
| 2,308,495 | D'Alelio | Jan. 19, 1943 |
| 2,446,121 | Adelson et al. | July 27, 1948 |
| 2,473,801 | Kropa | June 21, 1949 |
| 2,816,827 | Roth | Dec. 17, 1957 |
| 2,873,226 | Davies et al. | Feb. 10, 1959 |

OTHER REFERENCES

"Polymerizable Derivatives of Long-Chain Fatty Acids," an article in Industrial and Engineering Chemistry, vol. 47, No. 3, March 1955, pages 472–480.

"Vinyl Plastics Modified With Chemicals From Animal Fats," U.S. Dept. of Agriculture Bulletin, December 1953.

"Vinyl and Related Polymers" (Schildnecht), published by John Wiley and Sons, Inc. (New York) 1952 (page 70 relied on.)